UNITED STATES PATENT OFFICE.

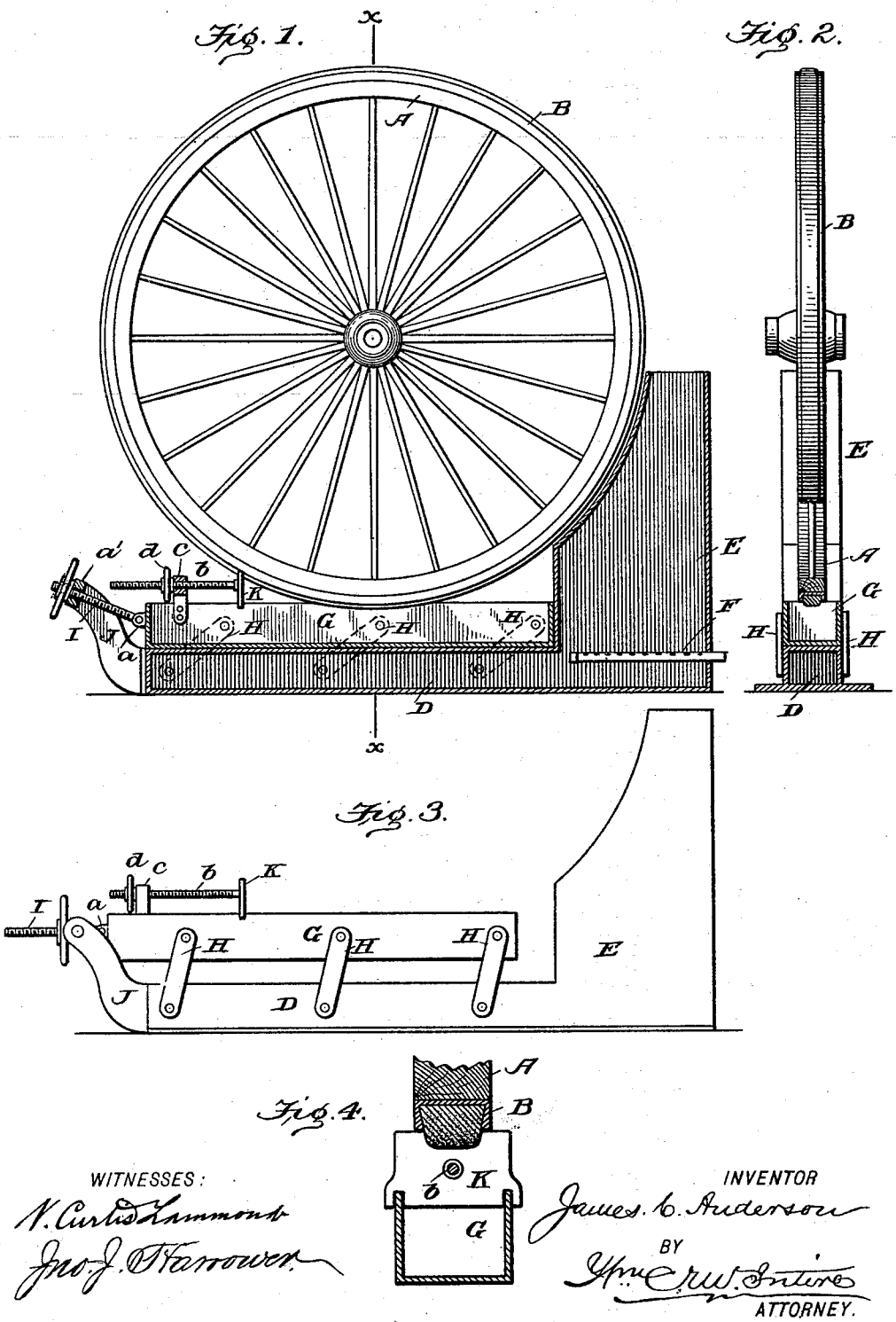

JAMES C. ANDERSON, OF HIGHLAND PARK, ILLINOIS.

APPARATUS FOR MAKING TIRES UPON WHEELS AND REPAIRING SAME.

SPECIFICATION forming part of Letters Patent No. 637,690, dated November 21, 1899.

Application filed June 14, 1899. Serial No. 720,514. (No model.)

*To all whom it may concern:*

Be it known that I, JAMES C. ANDERSON, a citizen of the United States, residing at Highland Park, in the county of Lake and State of Illinois, have invented a new and useful Apparatus for Making Tires upon Wheels and Repairing the Same; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a new and useful apparatus for making tires upon wheels and repairing the same.

In an application filed by me in the United States Patent Office on the 14th day of June, 1899, Serial No. 720,516, I have shown and described as a new article of manufacture a wheel provided with a tire composed of asphaltum and sand, and in an application divided from my present application as originally filed, and filed on the 21st day of July, 1899, Serial No. 724,683, I have fully described and claimed a novel method of making the improved tire.

My present invention has for its object an apparatus designed to carry out the method and to produce the tire as described in the above-mentioned applications and which shall be also adapted for use in repairing or restoring the improved tires referred to; and with these ends in view my invention consists in the peculiar construction and arrangement hereinafter more fully described.

In order that others may know how to make and use my improved apparatus, I will proceed to describe the same, referring by letters to the accompanying drawings, in which—

Figure 1 is a central longitudinal section of an apparatus designed to carry out my improved method, the wheel upon which the tire is to be formed being shown in elevation. Fig. 2 is a vertical cross-section taken at the line $x\,x$ of Fig. 1. Fig. 3 is a side elevation of the apparatus with the wheel removed; and Fig. 4 is a detail cross-section showing the hopper, the rim of the wheel, the tire in course of formation, and a scraper or gage.

Similar letters of reference indicate like parts in the several views.

A represents the rim of a wheel provided with a metallic box or tire-receptacle B, such as is described and shown in my pending application, Serial No. 720,516, filed June 14, 1899. This wheel is mounted upon any suitable axis, so as to bear the proper relation, as shown, with my improved apparatus, which consists of a hollow metal box having a base D and an upwardly-projecting end E, the interior face of which is curved, as shown, to conform with the periphery of the wheel.

F is a burner located within the hollow box and designed to heat the same; but in lieu of the burner F the box may be equipped with steam-pipes suitably located, or steam may be admitted directly to the interior of the box.

G is a tank designed to contain asphaltum or equivalent material and is mounted upon and secured thereto by parallel arms H on each side, which arms are pivoted at their ends to the tank G and base D, respectively, in order that the tank G may be raised, as shown at Fig. 3. The elevation and return of the tank are secured through the medium of a hand-screw I, pivotally connected to a lug $a$ on the end of the tank and traveling through an oscillatory nut $a'$, pivoted to the upper end of an arm J, extending from the end of the base D of the hollow box.

K is a gage-scraper adapted to ride upon the parallel side walls of the tank G. This gage-plate has its upper edge cut out in a design to conform to any predetermined profile desired for the tread-surface of the tire on the wheel, which projects beyond the receptacle B on the rim. The scraper-gage is provided with a screw-threaded arm $b$, passing through a bridge or lug $c$, secured to the tank near the end thereof, and said arm is provided with a threaded wing-nut or hand-wheel $d$, by means of which the gage-scraper may be caused to approach or recede from the periphery of the wheel in an obvious manner. This gage-scraper not only controls the profile of the tire and quantity of material applied, but also constitutes a guard to prevent the composition used in forming the tire from being thrown off by centrifugal action.

The purpose in constructing the box with hollow bottom D and end E is in order that the heat generated therein may be utilized to melt the composition located in the tank and keep it in proper plastic condition and to also radiate heat from the curved face of the end E to warm the tire on a wheel when it is desirable or becomes necessary to repair the same by engrafting thereon a suitable quantity of the composition constituting the tire.

The advantages of the composition tire, the method of constructing it, and the facility and manner of repairing it are fully described in the application constituting a division of this application.

What I claim herein, and desire to secure by Letters Patent, is—

1. An apparatus for building up composition tires upon wheels, which consists of a hollow box having a base D and an end E with curved face, adapted to be heated as described, a tank G mounted upon the base D and adapted to be raised and lowered, and means for raising and lowering the tank, substantially as and for the purposes set forth.

2. In combination with the hollow box D E, tank G, mounted on the box, and means for raising and lowering the tank, a gage-scraper and means for moving the same toward and from the center of the tank, substantially as and for the purpose set forth.

3. In combination with the hollow box D, E, tank G, mounted upon the box, and means for raising and lowering the tank, a heating device substantially as described for heating the box D, E and tank G, substantially as and for the purpose set forth.

In testimony whereof I affix my signature in presence of two witnesses.

JAMES C. ANDERSON.

Witnesses:
N. CURTIS LAMMOND,
JNO. J. HARROWER.